United States Patent
Ikeda

(10) Patent No.: US 11,728,745 B2
(45) Date of Patent: Aug. 15, 2023

(54) ELECTRONIC CIRCUIT AND ELECTRONIC APPARATUS FOR VOLTAGE CHANGE RATE DETECTION

(71) Applicant: KABUSHIKI KAISHA TOSHIBA, Tokyo (JP)

(72) Inventor: Kentaro Ikeda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 17/187,590

(22) Filed: Feb. 26, 2021

(65) Prior Publication Data

US 2021/0376760 A1 Dec. 2, 2021

(30) Foreign Application Priority Data

May 26, 2020 (JP) .................................. 2020-091609

(51) Int. Cl.
*H02M 7/537* (2006.01)
*H02M 1/00* (2006.01)
*B60R 16/03* (2006.01)

(52) U.S. Cl.
CPC ......... *H02M 7/537* (2013.01); *H02M 1/0003* (2021.05); *H02M 1/0009* (2021.05); *B60R 16/03* (2013.01)

(58) Field of Classification Search
CPC .......... H02M 7/537; H02M 7/53; H02M 1/08; H02M 1/0009; H02M 1/0003; H02M 1/0029; B60R 16/03
See application file for complete search history.

(56) References Cited

U.S. PATENT DOCUMENTS

| | | | | |
|---|---|---|---|---|
| 2018/0026538 A1* | 1/2018 | Dalena | ..................... | H02M 7/48 323/271 |
| 2019/0296634 A1* | 9/2019 | Ikeda | ................... | H02M 7/5387 |
| 2020/0358354 A1* | 11/2020 | You | ......................... | H02M 1/08 |
| 2021/0126552 A1* | 4/2021 | Ikeda | ..................... | H02M 1/08 |
| 2021/0184598 A1* | 6/2021 | Ikeda | ..................... | H02M 1/08 |

FOREIGN PATENT DOCUMENTS

| | | |
|---|---|---|
| JP | H6-38511 A | 2/1994 |
| JP | 3474350 B2 | 12/2003 |
| JP | 2006-222593 A | 8/2006 |
| JP | 2011-10447 A | 1/2011 |
| JP | 2021-96089 A | 6/2021 |

* cited by examiner

*Primary Examiner* — Jeffrey A Gblende
*Assistant Examiner* — Jye-June Lee
(74) *Attorney, Agent, or Firm* — Finnegan, Henderson, Farabow, Garrett & Dunner, LLP

(57) ABSTRACT

An electronic circuit has an output node that outputs a DC signal indicating a temporal change rate of a voltage of a measurement target node, a first capacitor and a first resistor that are connected in series between the measurement target node and a first reference voltage node, a second capacitor that is connected between the output node and a second reference voltage node, a first switch that switches whether or not to short-circuit the first reference voltage node and the output node, and a rectifier circuit that flows a current to a connection node between the first capacitor and the first resistor from the output node, and cuts off a current to the output node from the connection node.

20 Claims, 13 Drawing Sheets

ELECTRONIC CIRCUIT AND ELECTRONIC APPARATUS FOR VOLTAGE CHANGE RATE DETECTION

CROSS REFERENCE TO RELATED APPLICATIONS

This application is based upon and claims the benefit of priority from the prior Japanese Patent Application No. 2020-91609, filed on May 26, 2020, the entire contents of which are incorporated herein by reference.

FIELD

An embodiment of the present invention relates to an electronic circuit and electronic apparatus.

BACKGROUND

Since an EV vehicle and an HV vehicle require a large drive voltage in order to drive a motor, a power converter that converts a DC voltage exceeding 100 V into an AC voltage is provided. The power converter generates the AC voltage by turning on or off a switching element such as a power MOSFET and an IGBT. However, when a temporal change rate of the AC voltage generated by the switching element fluctuates due to noise or load fluctuations, there is a concern that an operation of the motor becomes unstable.

Since a voltage level of the AC voltage generated by turning on or off the switching element fluctuates greatly with time, it is not easy to accurately measure the temporal change rate. For example, it is considered that a voltage waveform of the AC voltage is displayed on a display unit of a measuring instrument such as an oscilloscope and the temporal change rate is converted from the voltage waveform. However, there is a problem that it takes time and effort and the temporal change rate of the AC voltage cannot be detected in real time.

DETAILED DESCRIPTION

According to one embodiment, an electronic circuit has: an output node that outputs a DC signal indicating a temporal change rate of a voltage of a measurement target node;
a first capacitor and a first resistor that are connected in series between the measurement target node and a first reference voltage node;
a second capacitor that is connected between the output node and a second reference voltage node;
a first switch that switches whether or not to short-circuit the first reference voltage node and the output node; and
a rectifier circuit that flows a current to a connection node between the first capacitor and the first resistor from the output node, and cuts off a current to the output node from the connection node.

Hereinafter, embodiments of a voltage change rate detection circuit, a semiconductor device, and a power converter will be described with reference to the drawings. Hereinafter, main components of the voltage change rate detection circuit, the semiconductor device, and the power converter will be mainly described, but there can be components and functions not illustrated or described in the voltage change rate detection circuit, the semiconductor device, and the power converter. The following description does not exclude the components and functions not illustrated or described.

First Embodiment

Figure 1:
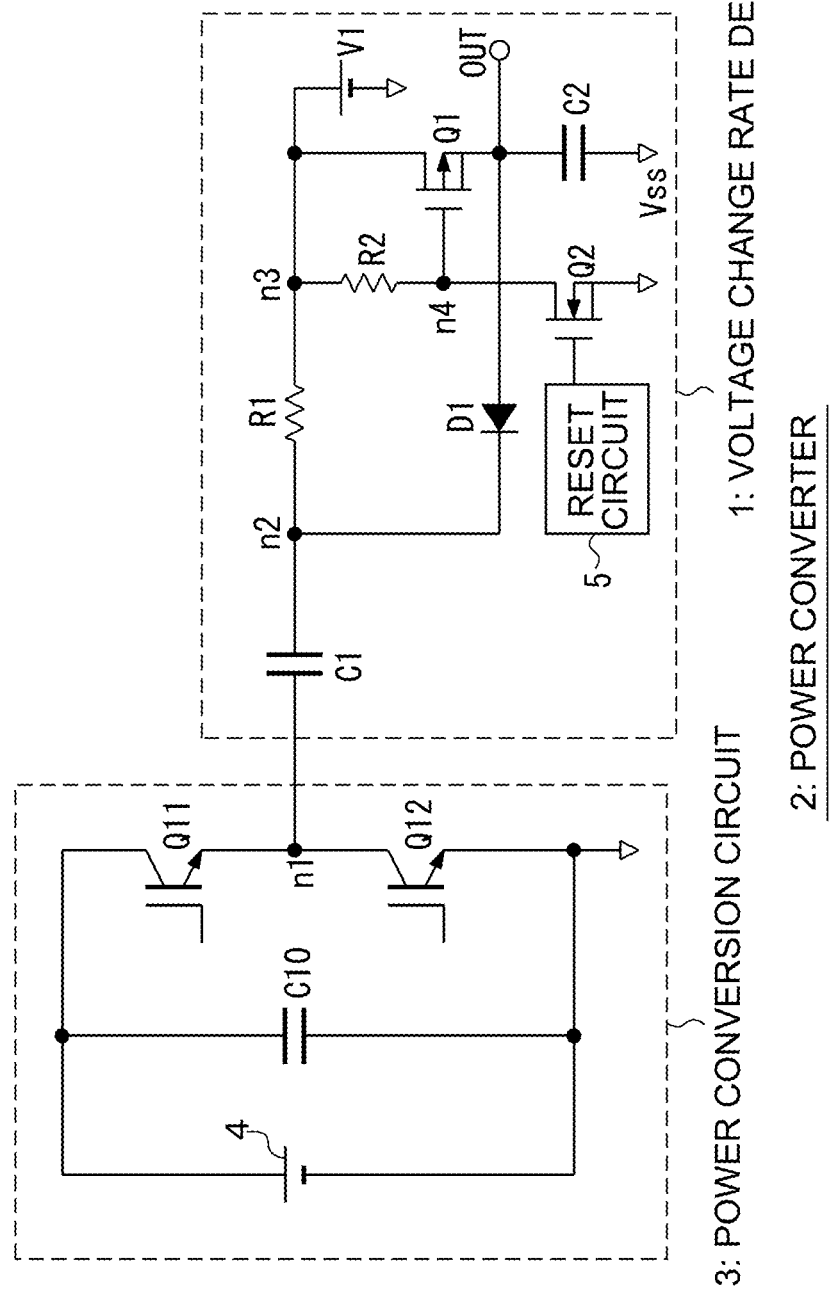
FIG. 1 is a circuit diagram of a power converter including a voltage change rate detection circuit according to a first embodiment.

FIG. 1 is a circuit diagram of a power converter 2 including a voltage change rate detection circuit 1 according to a first embodiment. The voltage change rate detection circuit 1 may be called as an electronic circuit, and the power converter 2 may be called an electronic apparatus. The power converter 2 includes the voltage change rate detection circuit 1 and a power conversion circuit 3. The voltage change rate detection circuit 1 is connected to a measurement target node n1 which is an output node of the power conversion circuit 3. The power conversion circuit 3 converts a DC voltage into an AC voltage by using, for example, switching elements Q11 and Q12. The power conversion circuit 3 of FIG. 1 includes a DC power source 4, a capacitor C10, and the switching elements Q11 and Q12, but a specific circuit configuration of the power conversion circuit 3 does not matter.

The voltage change rate detection circuit 1 of FIG. 1 detects a temporal change rate dv/dt of an output voltage of the power conversion circuit 3. The output voltage of the power conversion circuit 3 is output from the output node (measurement target node) n1 of the power conversion circuit 3. The voltage change rate detection circuit 1 of FIG. 1 detects the temporal change rate dv/dt of a voltage of the measurement target node n1. In particular, the voltage change rate detection circuit 1 of FIG. 1 has a feature that the temporal change rate dv/dt when the voltage of the measurement target node n1 falls can be detected accurately.

The voltage change rate detection circuit 1 of FIG. 1 includes an output node OUT, a first capacitor C1, a first resistor R1, a second capacitor C2, a first transistor Q1, and a first rectifier circuit D1.

The output node OUT of the voltage change rate detection circuit 1 outputs a DC signal indicating the temporal change rate dv/dt of the voltage of the measurement target node n1. The first capacitor C1 and the first resistor R1 are connected in series between the measurement target node n1 and a first reference voltage node n3. A DC voltage source V1 is connected to the first reference voltage node n3. A voltage level of the DC voltage source V1 is, for example, a predetermined voltage larger than 0 V.

The second capacitor C2 is connected between the output node OUT of the voltage change rate detection circuit 1 and a second reference voltage node Vss. The second reference voltage node Vss is, for example, 0 V or ground level. The second reference voltage node Vss has a voltage level smaller than the first reference voltage node n3.

The first transistor Q1 switches whether or not to short-circuit the first reference voltage node n3 and the output node OUT. The first transistor Q1 decreases the voltage of the output node OUT according to the amount of decrease of the voltage of the measurement target node n1.

The first rectifier circuit D1 flows a current from the output node OUT to a connection node n2 between the first capacitor C1 and the first resistor R1 and cuts off the current from the connection node n2 to the output node OUT. Hereinafter, an example in which the first rectifier circuit D1 is a diode D1 will be described. An anode of the diode D1 is connected to the output node OUT, and a cathode is connected to the connection node n2 between the first capacitor C1 and the first resistor R1.

The voltage change rate detection circuit 1 of FIG. 1 may include a second resistor R2 and a second transistor Q2 connected in series between the first reference voltage node n3 and the second reference voltage node Vss. The second transistor Q2 is temporarily turned on after the second capacitor C2 holds a charge corresponding to the temporal change rate dv/dt when the voltage of the measurement target node n1 falls. The second transistor Q2 controls whether or not to set a control terminal (for example, a gate) of the first transistor Q1 to have the same potential as the second reference voltage node Vss. More specifically, the second transistor Q2 temporarily sets the control terminal of the first transistor Q1 to have the same potential as the second reference voltage node Vss after the second capacitor C2 holds a charge corresponding to the temporal change rate dv/dt of the voltage of the measurement target node n1.

A reset circuit 5 is connected to a control terminal (for example, a gate) of the second transistor Q2. The reset circuit 5 supplies a pulse signal for temporarily setting the control terminal of the first transistor Q1 to have the same potential as the second reference voltage node Vss to the control terminal of the second transistor Q2 at the time of initial setting and for a predetermined period after the second capacitor C2 holds the charge corresponding to the temporal change rate dv/dt of the voltage of the measurement target node n1. The accumulated charge of the second capacitor C2 is periodically reset in the reset circuit 5, and thus, a DC signal corresponding to the temporal change rate dv/dt can be output from the output node OUT whenever the voltage of the output node n1 of the power conversion circuit 3 changes.

For example, the first transistor Q1 and the second transistor Q2 have different conductive types. In FIG. 1, the first transistor Q1 is a P-type transistor, and the second transistor Q2 is an N-type transistor. A source of the first transistor Q1 is connected to the first reference voltage node n3. A drain of the first transistor Q1 is connected to the output node OUT. A gate of the first transistor Q1 is connected to a drain of the second transistor Q2. A source of the second transistor Q2 is connected to the second reference voltage node Vss. The reset circuit 5 is connected to a gate of the second transistor Q2.

Since the voltage of the output node n1 of the power conversion circuit 3 changes periodically, it is necessary to periodically reset the second capacitor C2 that accumulates the charge corresponding to the temporal change rate dv/dt of the voltage of the output node n1. In the present specification, the charge in the second capacitor C2 at the time of reset is referred to as a reset charge. The accumulated charge of the second capacitor C2 is reset by temporarily turning on the first transistor Q1. When the first transistor Q1 is temporarily turned on, the second transistor Q2 is turned on, the first reference voltage node n3 and the output node OUT have the same potential, and the reset charge is accumulated in the second capacitor C2.

As stated above, in the voltage change rate detection circuit 1 of FIG. 1, the reset charge is accumulated in the second capacitor C2 whenever the first transistor Q1 is turned on, and then the charge corresponding to the temporal change rate dv/dt of the voltage of the output node n1 of the power conversion circuit 3 is accumulated in the second capacitor C2. Thus, the DC signal corresponding to the temporal change rate dv/dt can be repeatedly output from the output node OUT.

Figure 2:
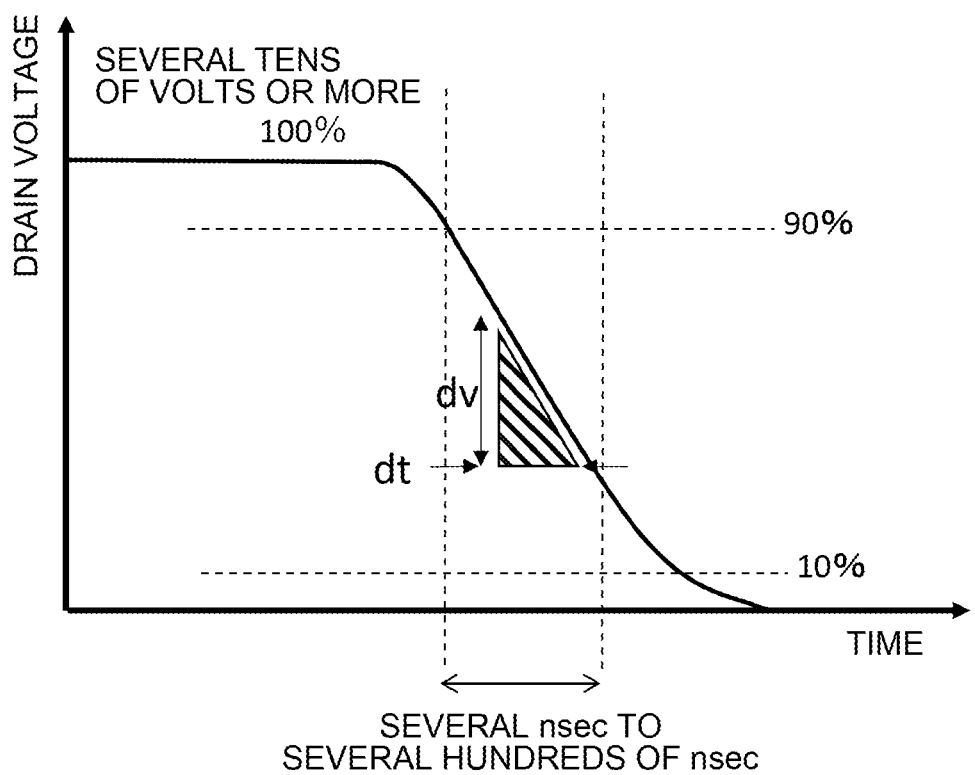
FIG. 2 illustrates a voltage waveform of an output node (measurement target node) of a power conversion circuit.

FIG. 2 is a diagram illustrating a voltage waveform of the output node (measurement target node) n1 of the power conversion circuit 3. The power conversion circuit 3 outputs an AC voltage whose voltage level changes periodically from the output node n1. FIG. 2 illustrates a voltage waveform in a transient state in which the voltage level of the output node n1 of the power conversion circuit 3 falls from a voltage of several tens of volts or more. The voltage change rate detection circuit 1 according to the present embodiment outputs a DC signal having, as the voltage level, a value of the temporal change rate dv/dt of the voltage in the voltage waveform in the transient state illustrated in FIG. 2. As illustrated in the voltage waveform of FIG. 2, the temporal change rate dv/dt of the voltage of the output node n1 of the power conversion circuit 3 is almost constant in the transient state, the charge corresponding to the temporal change rate dv/dt at this time is accumulated in the second capacitor C2, and the DC signal is output from the output node OUT according to this accumulated charge.

Figure 3:
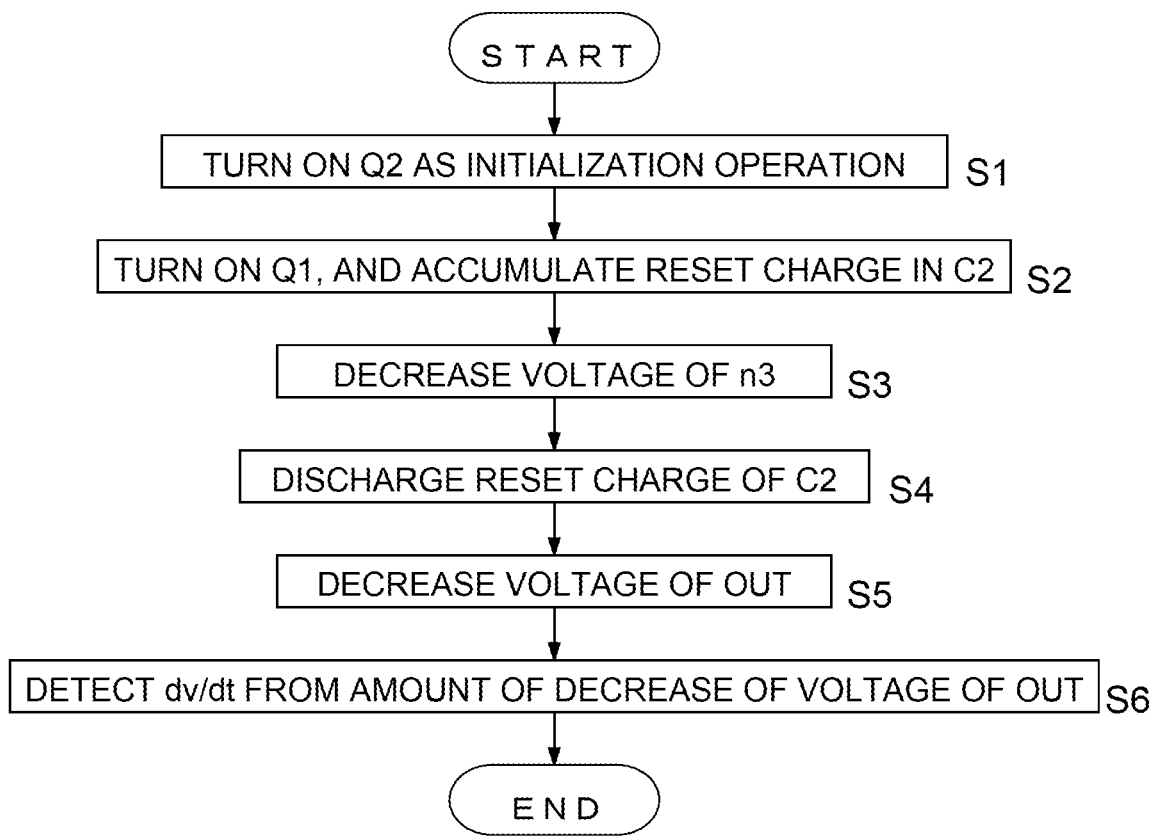
FIG. 3 is a flowchart illustrating an operation of the voltage change rate detection circuit of FIG. 1.

FIG. 3 is a flowchart illustrating an operation of the voltage change rate detection circuit 1 of FIG. 1. Hereinafter, the operation of the voltage change rate detection circuit 1 of FIG. 1 will be described with reference to the flowchart of FIG. 3. When a power source voltage is supplied to the voltage change rate detection circuit 1 of FIG. 1, the second transistor Q2 is turned on as an initialization operation (step S1). Accordingly, a source voltage of the second transistor Q2 decreases to a voltage (ground voltage) of the second reference voltage node Vss, and the first transistor Q1 is turned on. When the first transistor Q1 is turned on, the reset charge corresponding to the voltage of the first reference voltage node n3 is accumulated in the second capacitor C2 (step S2).

Figure 4:
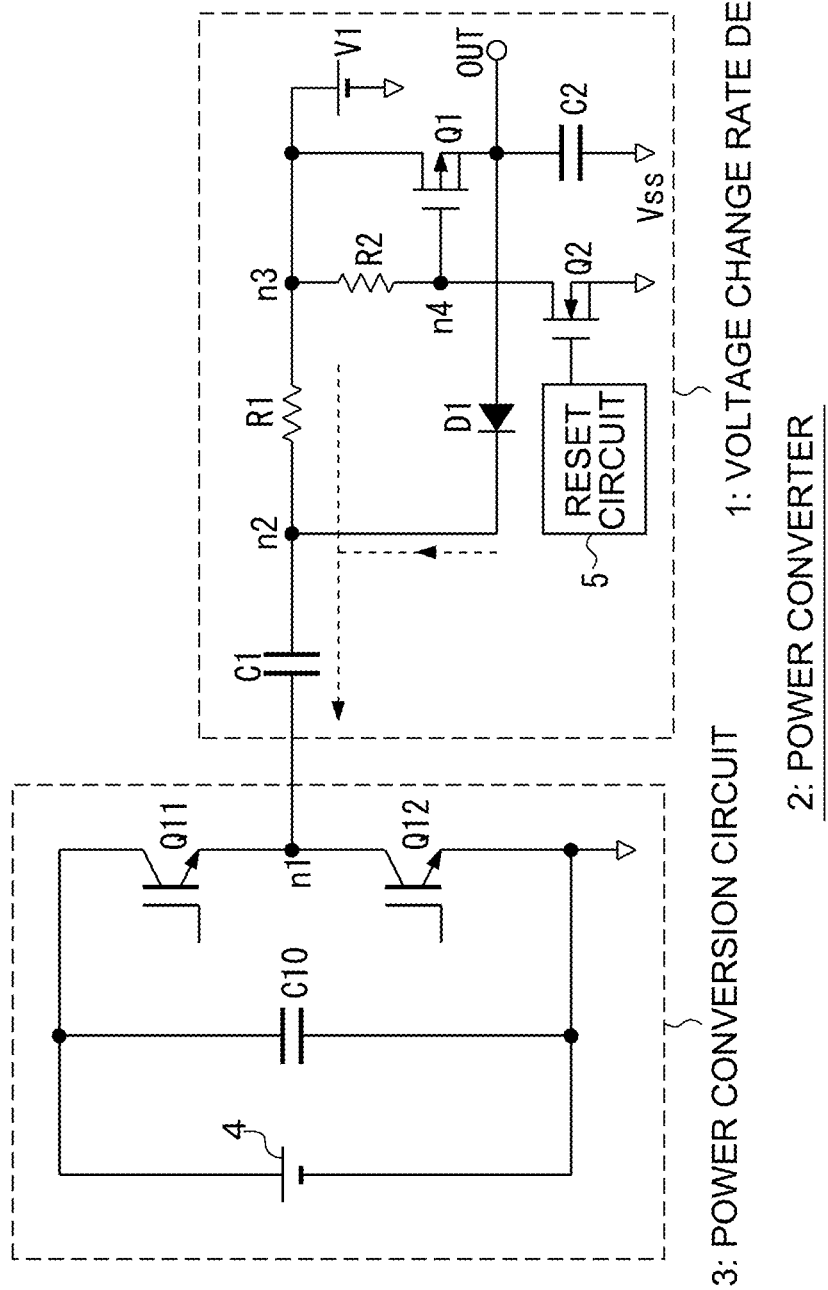
FIG. 4 illustrates a current path through which a current flows when an output voltage of the power conversion circuit falls.

Thereafter, when the voltage of the output node n1 of the power conversion circuit 3 falls, since the current flows from the first reference voltage node n3 to the output node n1 through the first resistor R1 and the first capacitor C1 as illustrated by arrow lines of FIG. 4, the voltage of the first reference voltage node n3 decreases (step S3). Accordingly, the second transistor Q2 tries to decrease the voltage of the output node OUT, and the reset charge accumulated in the second capacitor C2 is discharged via the diode D1 as illustrated by the arrow lines of FIG. 4 (step S4). Accordingly, the accumulated charge of the second capacitor C2 is reduced, and the voltage of the output node OUT decreases (step S5). The amount of decrease of the voltage of the output node OUT becomes a value corresponding to the temporal change rate dv/dt of the output node n1 of the power conversion circuit 3 (step S6). Even though the voltage of the output node n1 of the power conversion circuit 3 does not change, the current from the connection node n2 between the first capacitor C1 and the first resistor R1 to the second capacitor C2 is cut off by a rectifying action of the diode D1, and the accumulated charge of the second capacitor C2 is held until the first transistor Q1 is turned on.

As stated above, the voltage change rate detection circuit 1 of FIG. 1 can discharge the accumulated charge of the second capacitor C2 by the amount of decrease of the voltage when the voltage of the output node n1 of the power conversion circuit 3 falls, and can hold the accumulated charge of the second capacitor C2 by the rectifying action of the diode D1 when the voltage of the output node n1 of the power conversion circuit 3 does not decrease. Accordingly, the temporal change rate dv/dt when the voltage of the output node n1 of the power conversion circuit 3 falls can be detected by the DC signal of the output node OUT.

Figure 5:
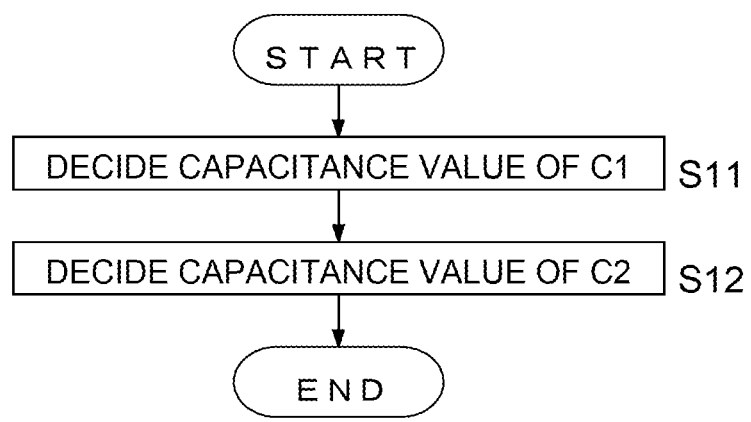
FIG. 5 is a diagram illustrating a procedure for deciding circuit parameters in the voltage change rate detection circuit.

Next, a procedure for deciding a circuit parameter of each circuit element of the voltage change rate detection circuit 1 of FIG. 1 will be described. FIG. 5 is a diagram illustrating the procedure for determining the circuit parameter in the voltage change rate detection circuit 1. First, a capacitance value of the first capacitor C1 is decided (step S11). A capacitance of the first capacitor C1 is preferably smaller than an output capacitance Coss of the power conversion circuit 3, and is set to, for example, 1/10 or less of the output capacitance Coss. Accordingly, the capacitance of the first capacitor C1 can be suppressed to an extent that a loss is negligible. The capacitance of the first capacitor C1 is likely to be limited by the temporal change rate dv/dt of the voltage of the output node n1 of the power conversion circuit 3 and a displacement current flowing through the first capacitor C1.

Subsequently, a necessary gain is calculated from the displacement current flowing through the first capacitor C1, and a resistance value of the first resistor R1 and a capacitance of the second capacitor C2 are decided (step S12). When the first resistor R1 is large, the voltage change of the output node n1 of the power conversion circuit 3 is ended before the DC signal corresponding to the temporal change rate dv/dt of the voltage of the output node n1 of the power conversion circuit 3 is output from the output node OUT. Thus, there is an upper limit to the resistance value of the first resistor R1. Even though the capacitance of the second capacitor C2 is too large, the voltage change of the output node n1 of the power conversion circuit 3 is ended before the DC signal is output from the output node OUT. Thus, there is an upper limit to the capacitance of the second capacitor C2.

In step S12 of FIG. 5 described above, a time constant of the voltage change rate detection circuit 1 of FIG. 1 may be decided after the capacitance of the first capacitor C1 is decided. The time constant is a design matter, but may be set to 100 nanoseconds or less, for example. In this case, a time constant T may satisfy the following Inequation (1) by using a resistance value R1 of the first resistor R1, a capacitance C1 of the first capacitor C1, and a capacitance C2 of the second capacitor C2.

$$T \geq 2.2 \times R \times (C1+C2) \tag{1}$$

Here, a DC signal Vout output from the output node OUT of the voltage change rate detection circuit 1 can be expressed by the following Equation (2). Equation (2) is obtained by performing Laplace transform on a transfer function from an input to an output.

$$Vout = C1 \times R \times (dv/dt) \times [1-\exp\{-t/R(C1+C2)\}] \tag{2}$$

Figure 6:
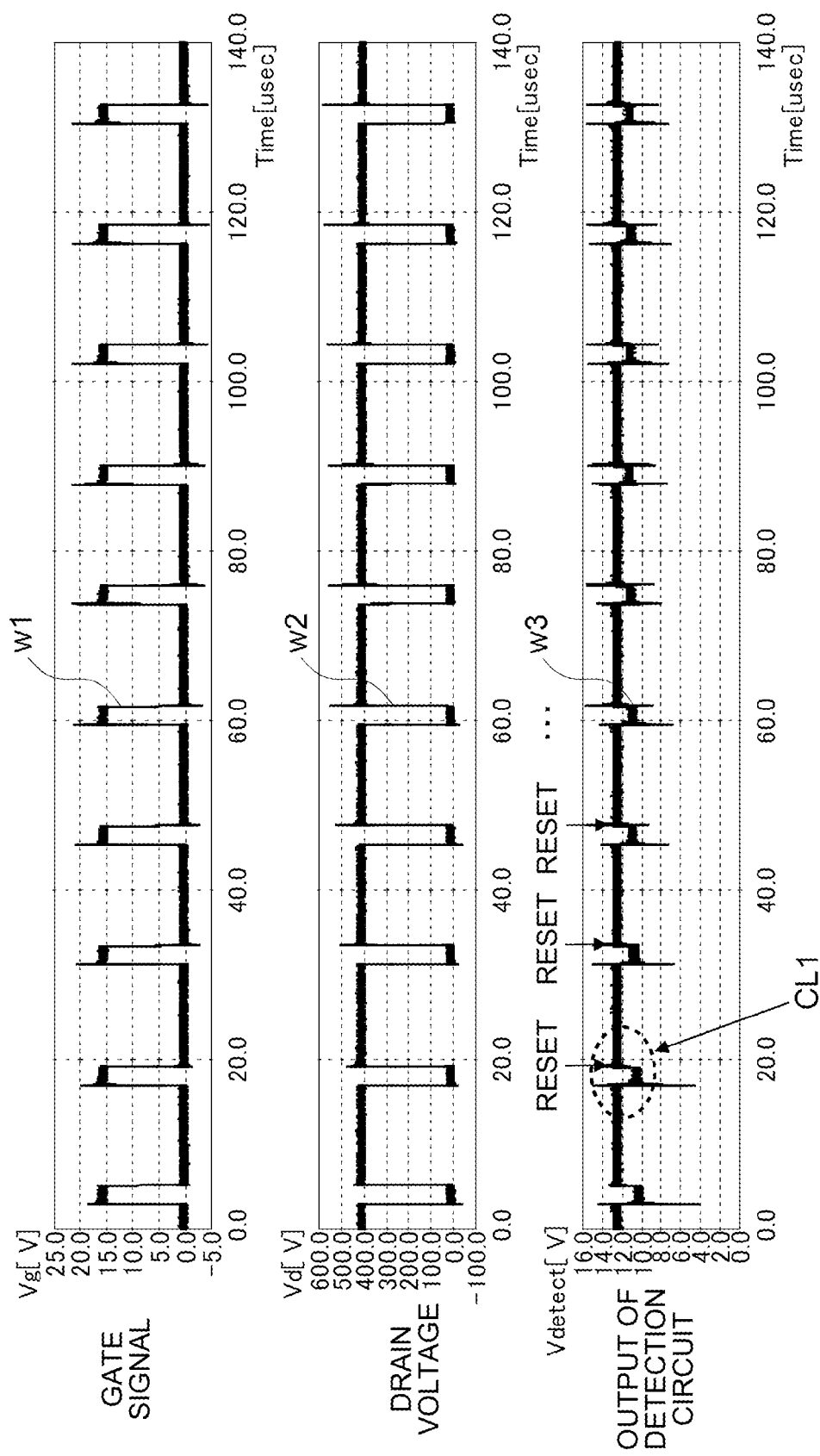
FIG. 6 is a voltage waveform diagram of the voltage change rate detection circuit of FIG. 1.
Figure 7:
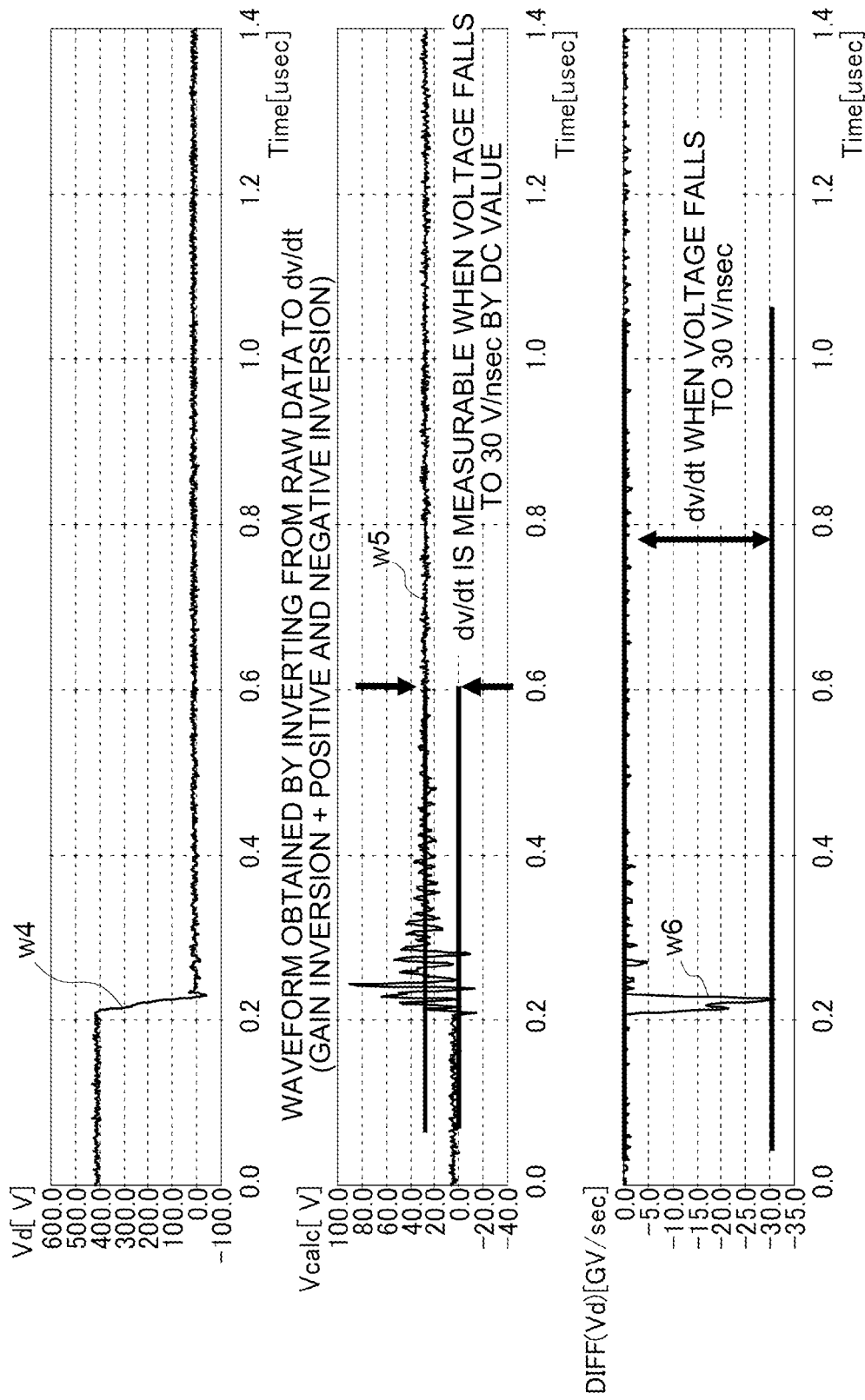
FIG. 7 is a waveform diagram in which a voltage waveform near a timing at which the output voltage of the power conversion circuit falls is enlarged in a time axis direction.

FIGS. 6 and 7 are voltage waveform diagrams of the voltage change rate detection circuit 1 of FIG. 1. FIGS. 6 and 7 illustrate voltage waveforms observed with an oscilloscope. FIG. 6 illustrates a gate voltage waveform w1 of an output transistor in the power conversion circuit 3, a voltage waveform w2 of the drain (measurement target node n1) of the output transistor in the power conversion circuit 3, and a voltage waveform w3 of the output node OUT of the voltage change rate detection circuit 1. FIG. 7 is a waveform diagram in which a voltage waveform near a timing at which the voltage of the output node n1 of the power conversion circuit 3 falls is enlarged in a time axis direction. FIG. 7 illustrates a voltage waveform w4 of the output node n1 of the power conversion circuit 3, a voltage waveform w5 of the output node OUT of the voltage change rate detection circuit 1, and a waveform w6 of the temporal change rate dv/dt of the output node n1 of the power conversion circuit 3.

As represented by a broken line circle CL1 of FIG. 6, when the voltage of the measurement target node n1 falls, the DC voltage corresponding to the temporal change rate dv/dt when the voltage of the measurement target node n1 falls is output from the output node OUT of the voltage change rate detection circuit 1. The voltage of the output node OUT of the voltage change rate detection circuit 1 contains a ringing component immediately after the voltage of the measurement target node n1 falls, but ringing disappears in a relatively short time, and a stable DC signal is output.

An arrow line indicating a voltage level at the time of voltage stabilization of the voltage waveform w5 of FIG. 7 indicates the temporal change rate dv/dt when the voltage of the output node n1 of the power conversion circuit 3 falls. An arrow line of the voltage waveform w6 in FIG. 7 indicates a value obtained by measuring the temporal change rate dv/dt when the voltage of the output node n1 of the power conversion circuit 3 falls with the oscilloscope.

Figure 8:
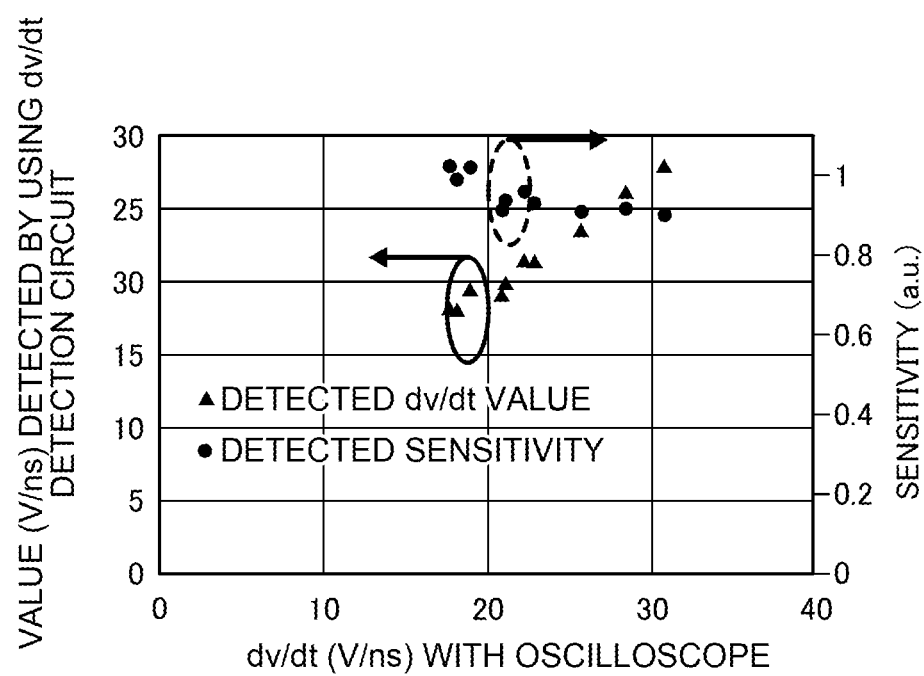
FIG. 8 is a diagram in which the accuracy of the voltage change rate detection circuit of FIG. 1 is measured.

FIG. 8 is a diagram in which the accuracy of the voltage change rate detection circuit 1 of FIG. 1 is measured. FIG. 8 is a diagram in which a correspondence between the measured value of the oscilloscope for the temporal change rate dv/dt of the voltage of the output node n1 of the power conversion circuit 3 and the DC signal output from the output node OUT is illustrated in a plot and the sensitivity of the voltage change rate detection circuit 1 is illustrated in a plot.

As can be seen in FIG. 8, an error between the DC signal output from the output node OUT of the voltage change rate detection circuit 1 and the measured value of the oscilloscope is within about 10%, and the temporal change rate dv/dt when the voltage of the output node n1 of the power conversion circuit 3 falls can be accurately detected. It can be seen that the voltage change rate detection circuit 1 according to the present embodiment can output the DC signal corresponding to the temporal change rate dv/dt with almost constant sensitivity even though the voltage level of the output node n1 of the power conversion circuit 3 changes.

Figure 9:
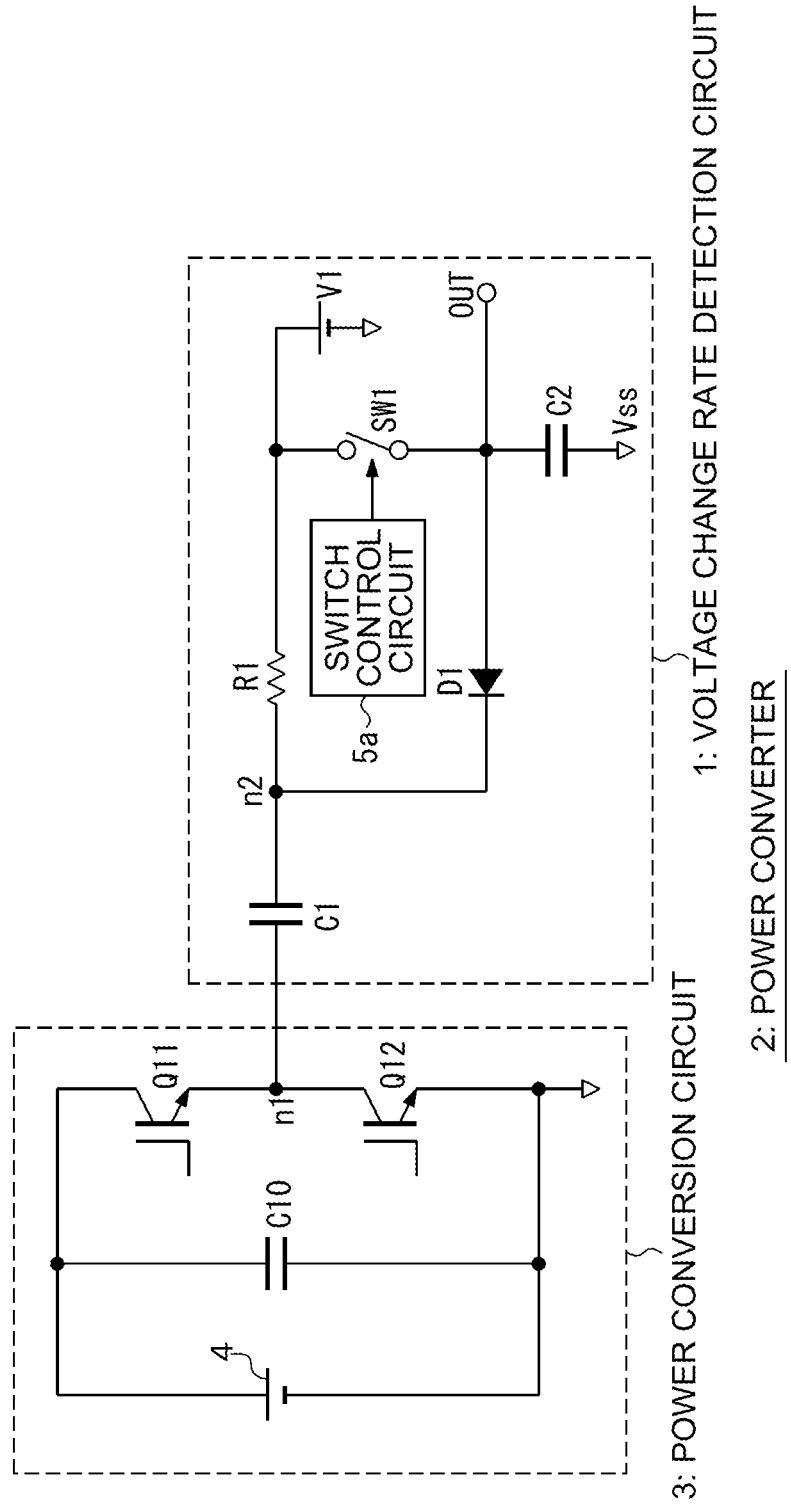
FIG. 9 is a circuit diagram of a voltage change rate detection circuit according to a first modification example.

FIG. 1 illustrates an example of a specific circuit configuration of the voltage change rate detection circuit 1 according to the present embodiment, but various modification examples can be considered in the circuit configuration of the voltage change rate detection circuit 1. FIG. 9 is a circuit diagram of a voltage change rate detection circuit 1 according to a first modification example. The voltage change rate detection circuit 1 of FIG. 9 includes the output node OUT, the first capacitor C1, the first resistor R1, the second capacitor C2, a first switch SW1, and the first rectifier circuit D1. Of these components, the circuit elements other than the first switch SW1 are the same as the circuit elements in the voltage change rate detection circuit 1 of FIG. 1.

The first switch SW1 corresponds to the first transistor Q1 of FIG. 1, and switches whether or not to short-circuit the first reference voltage node n3 and the output node OUT. When the first switch SW1 is turned on, the first reference voltage node n3 and the output node OUT are short-circuited. In this state, when the voltage of the output node n1 of the power conversion circuit 3 falls, the charge corresponding to the temporal change rate dv/dt of the voltage of the output node n1 is accumulated in the second capacitor C2, and a DC signal corresponding to the accumulated charge of the second capacitor C2 is output from the output node OUT. The first switch SW1 is controlled to be switched on or off by a switch control circuit 5a. The switch control circuit 5a corresponds to the reset circuit 5 of FIG. 1.

Figure 10:
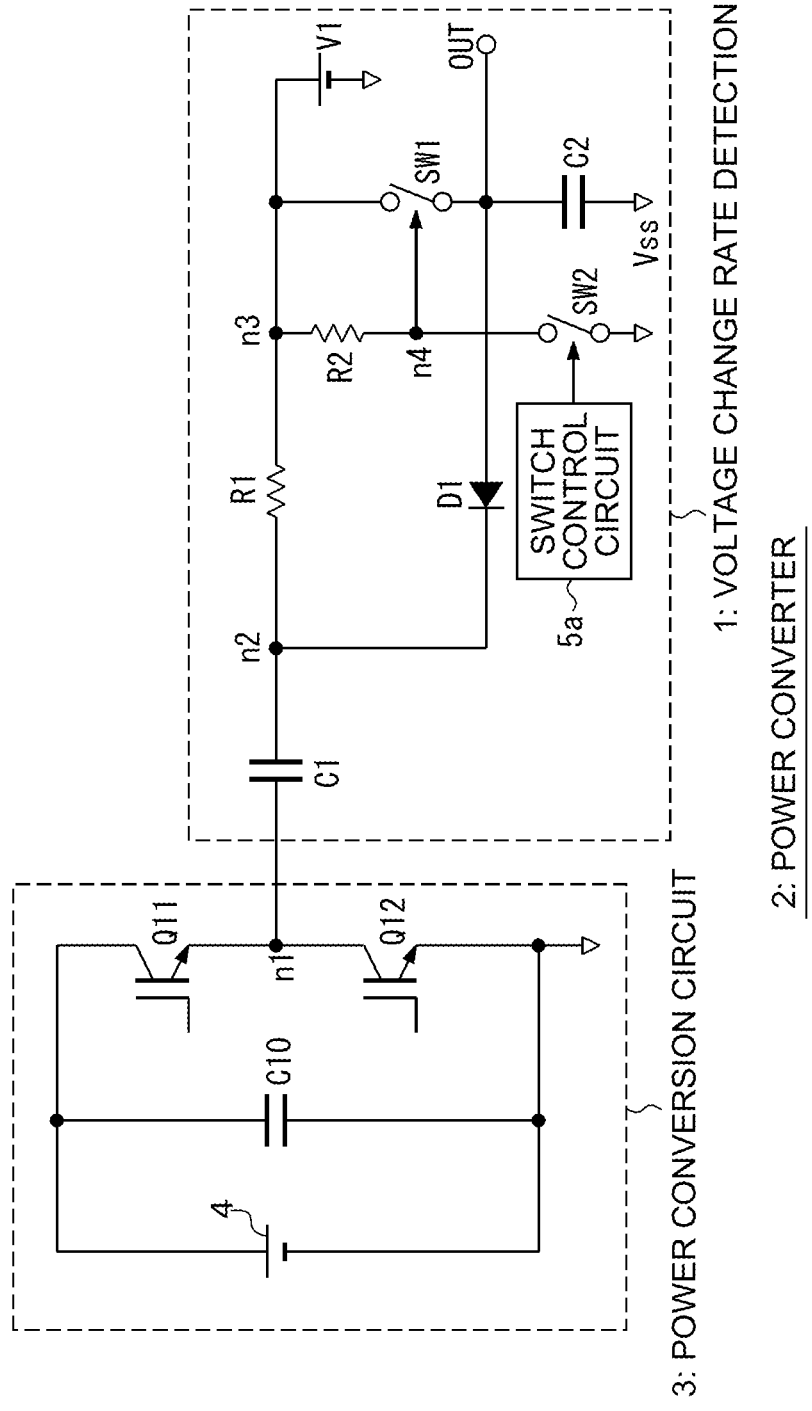
FIG. 10 is a circuit diagram of a voltage change rate detection circuit according to a second modification example.

FIG. 10 is a circuit diagram of a voltage change rate detection circuit 1 according to a second modification example. The voltage change rate detection circuit 1 of FIG. 10 includes the second resistor R2 and a second switch SW2 in addition to the circuit configuration of FIG. 9. The second resistor R2 and the second switch SW2 are connected in series between the first reference voltage node n3 and the second reference voltage node Vss. The first switch SW1 is turned on or off by a voltage of a connection node n4 between the second resistor R2 and the second switch SW2. The second switch SW2 is temporarily turned on after the second capacitor C2 holds the charge corresponding to the temporal change rate dv/dt when the voltage of the measurement target node n1 falls. The second switch SW2 is turned on or off by, for example, the reset circuit 5 illustrated in FIG. 1. That is, the second switch SW2 is turned on at the time of initial setting of the voltage change rate detection circuit 1 of FIG. 10 and for a predetermined period after the second capacitor C2 holds the charge corresponding to the temporal change rate dv/dt of the voltage of the measurement target node n1.

The voltage change rate detection circuit 1 of FIG. 1 has the first switch SW1 of FIG. 10 replaced with the first transistor Q1 and the second switch SW2 replaced with the second transistor Q2. As described above, the first transistor Q1 and the second transistor Q2 of FIG. 1 function as the first switch SW1 and the second switch SW2 in a broad sense.

Figure 11:
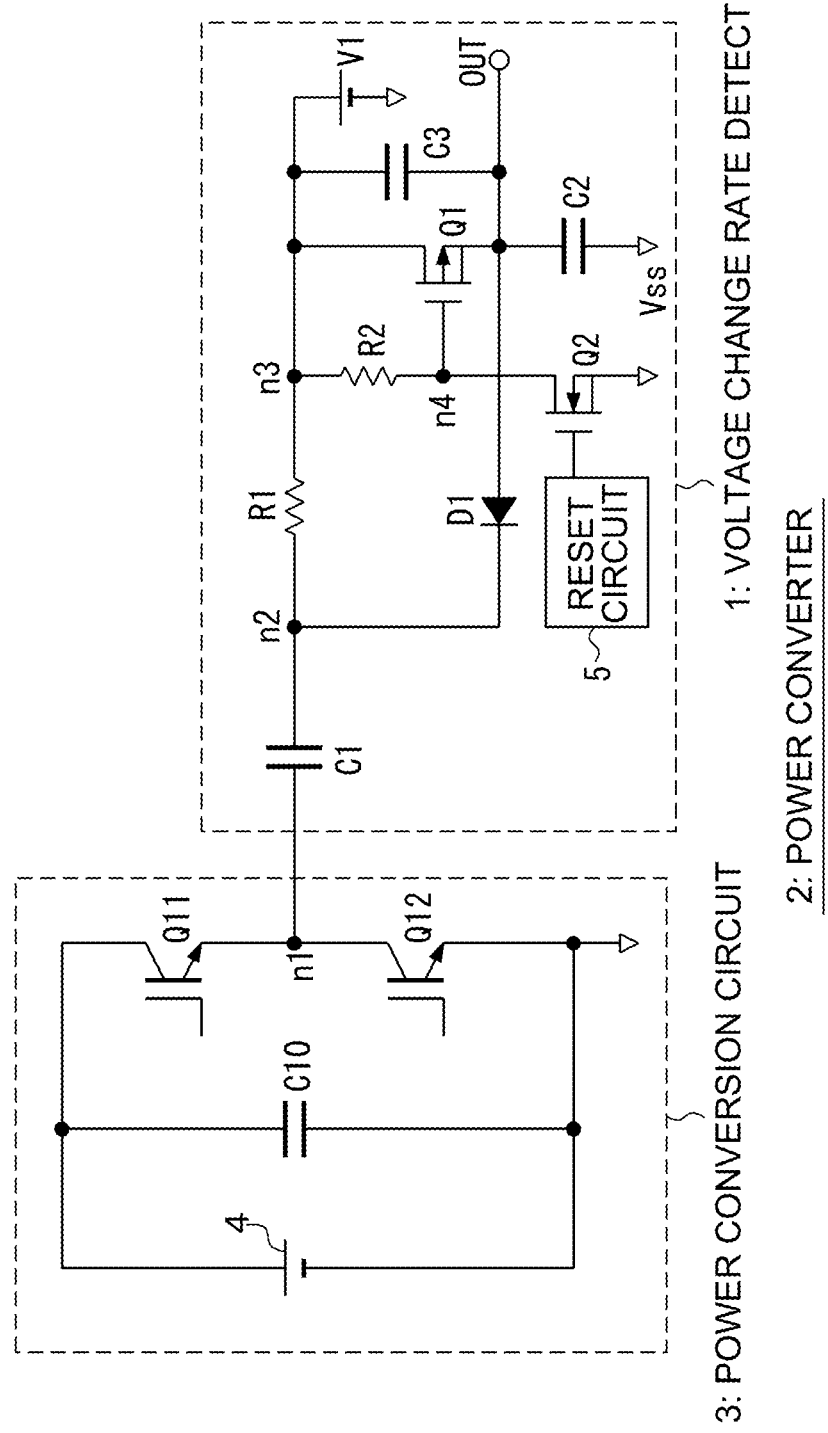
FIG. 11 is a circuit diagram of a voltage change rate detection circuit according to a third modification example.

FIG. 11 is a circuit diagram of a voltage change rate detection circuit 1 according to a third modification example. The voltage change rate detection circuit 1 of FIG. 11 includes a third capacitor C3 in addition to the circuit configuration of FIG. 1. The third capacitor C3 is connected between the drain and the source of the first transistor Q1. When the voltage of the output node n1 of the power conversion circuit 3 falls, the voltage of the output node OUT can be lowered more quickly by providing the third capacitor C3. Since the charge corresponding to the temporal change rate dv/dt of the voltage of the output node n1 of the power conversion circuit 3 can be accumulated in the second capacitor C2 more quickly, responsiveness can be improved.

As described above, in the first embodiment, since the temporal change rate dv/dt when the voltage of the output node n1 of the power conversion circuit 3 falls is detected as the DC signal, the temporal change rate dv/dt does not need to be detected from the voltage waveform displayed on the oscilloscope or the like, and the temporal change rate dv/dt of the voltage can be detected easily and accurately. In particular, according to the present embodiment, even after the voltage change of the output node n1 of the power conversion circuit 3 is ended, since the charge corresponding to the temporal change rate dv/dt continues to be held in the second capacitor C2, the temporal change rate dv/dt can be analyzed later.

The reset circuit 5 and the second transistor Q2 (second switch SW2) are provided, and thus, the temporal change rate dv/dt when the voltage of the output node n1 of the power conversion circuit 3 falls can be repeatedly detected.

Second Embodiment

The voltage change rate detection circuit 1 according to the first embodiment detects the temporal change rate dv/dt when the voltage of the output node n1 of the power conversion circuit 3 falls, but may also detect a temporal change rate dv/dt when the voltage of the output node n1 of the power conversion circuit 3 rises.

Figure 12:
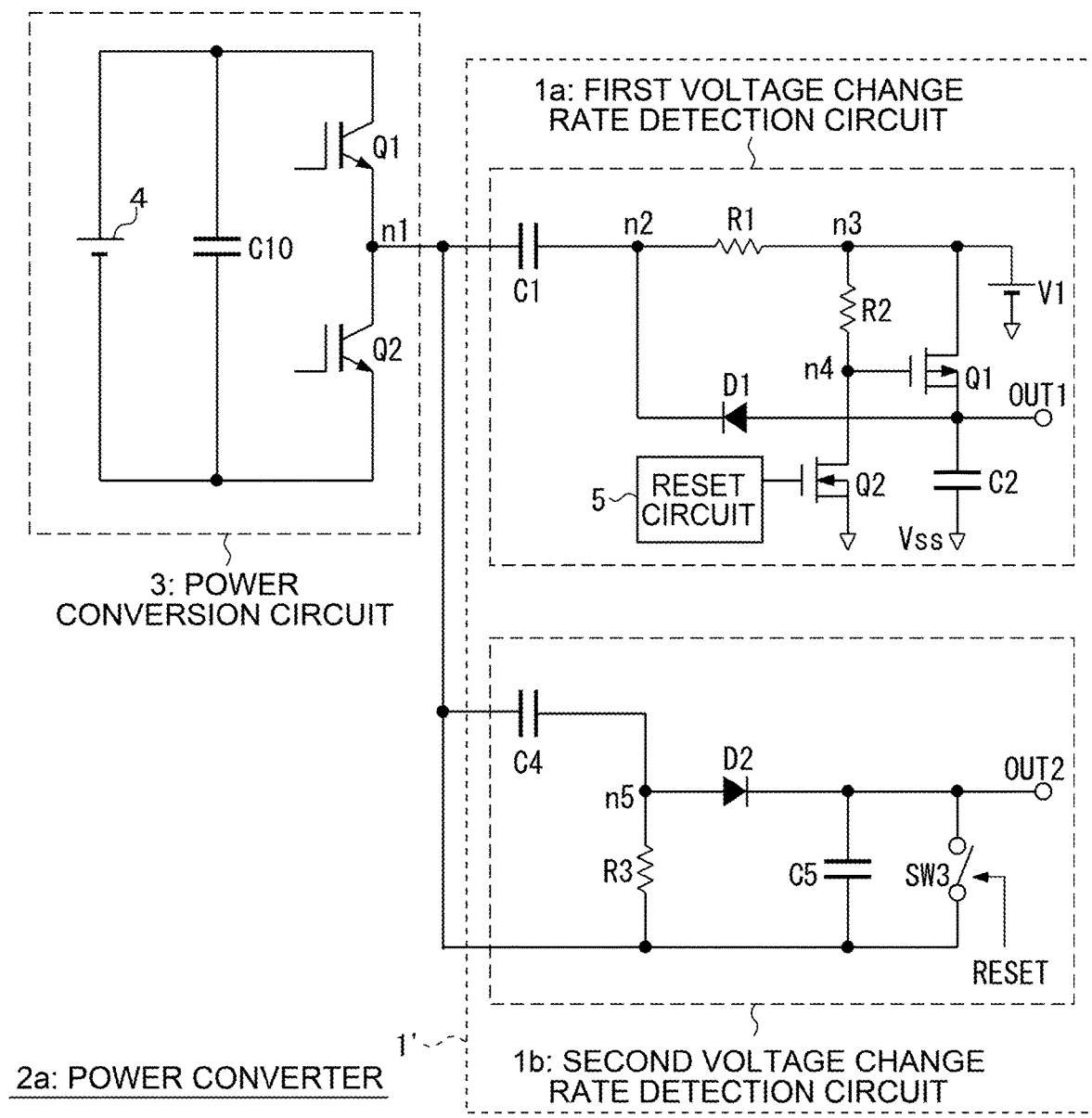
FIG. 12 is a circuit diagram of a power converter including a voltage change rate detection circuit according to a second embodiment.

FIG. 12 is a circuit diagram of a power converter 2a including a voltage change rate detection circuit 1' according to a second embodiment. The voltage change rate detection circuit 1' of FIG. 12 includes a first voltage change rate detection circuit 1a and a second voltage change rate detection circuit 1b. The first voltage change rate detection circuit 1a has the same circuit configuration as the voltage change rate detection circuit 1 of FIG. 1, and accumulates the charge corresponding to the temporal change rate dv/dt when the voltage of the output node n1 of the power conversion circuit 3 falls in the second capacitor C2. The first voltage change rate detection circuit 1a outputs the DC signal corresponding to the accumulated charge of the second capacitor C2 from a first output node OUT1. The first voltage change rate detection circuit 1a may have the same configuration as the voltage change rate detection circuit 1 of FIGS. 9 to 11.

The second voltage change rate detection circuit 1b accumulates the charge corresponding to the temporal change rate dv/dt when the voltage of the output node n1 of the power conversion circuit 3 rises in a fifth capacitor C5. The second voltage change rate detection circuit 1b includes a fourth capacitor C4, a third resistor R3, a second rectifier circuit D2, and the fifth capacitor C5. The fourth capacitor C4 and the third resistor R3 are connected in series between the measurement target node n1 and the second reference voltage node Vss. The second voltage change rate detection circuit 1b outputs a DC signal corresponding to the accumulated charge of the fifth capacitor C5 from a second output node OUT2.

The second rectifier circuit D2 is, for example, the diode D2. In the example of FIG. 12, an anode of the diode D2 is connected to a connection node n5 between the fourth capacitor C4 and the third resistor R3. A cathode of the diode D2 is connected to the output node OUT2 of the second voltage change rate detection circuit 1b. The fifth capacitor C5 is connected between the output node OUT2 of the second voltage change rate detection circuit 1b and the second reference voltage node Vss. The fifth capacitor C5 accumulates the charge corresponding to the temporal change rate dv/dt when the output voltage of the power conversion circuit 3 rises. Thus, the output node OUT2 of the second voltage change rate detection circuit 1b outputs a DC signal having a voltage level corresponding to the accumulated charge of the fifth capacitor C5. This DC signal is a signal indicating the temporal change rate dv/dt of the output node n1 of the power conversion circuit 3.

The second voltage change rate detection circuit 1b of FIG. 12 includes a third switch SW3 for switching whether or not to discharge the accumulated charge of the fifth capacitor C5. The third switch SW3 is connected between the output node OUT2 of the second voltage change rate detection circuit 1b and the second reference voltage node Vss. That is, the fifth capacitor C5 and the third switch SW3 are connected in parallel between the output node OUT2 of the second voltage change rate detection circuit 1b and the second reference voltage node Vss. The third switch SW3 can be a transistor.

From the viewpoint of detecting the temporal change rate dv/dt of the output voltage of the power conversion circuit 3, the third switch SW3 is not an essential component, but the temporal change rate dv/dt of the output voltage of the power conversion circuit 3 at another point in time cannot be detected as long as the accumulated charge of the fifth capacitor C5 is not discharged after the DC signal corresponding to the temporal change rate dv/dt at a certain point in time is output from the second voltage change rate detection circuit 1b. Thus, the third switch SW3 is provided in order to periodically discharge the accumulated charge of the fifth capacitor C5.

Next, an operation of the second voltage change rate detection circuit 1b of FIG. 12 will be described. When the voltage of the output node n1 of the power conversion circuit 3 rises, a current transiently flows through the fourth capacitor C4 to the third resistor R3. Accordingly, a voltage at both ends of the third resistor R3 increases. A current also flows to the fifth capacitor C5 via the diode D2, and the charge is accumulated. Thus, the voltage level of the output node OUT2 of the second voltage change rate detection circuit 1b increases. Even though the voltage of the output node n1 of the power conversion circuit 3 reaches a peak value or starts to fall, since the accumulated charge of the fifth capacitor C5 does not discharge if the third switch SW3 is turned off, the voltage level of the output node OUT2 connected to one end of the fifth capacitor C5 is held. Thus, the DC signal having the voltage level corresponding to the temporal change rate dv/dt of the voltage of the output node n1 of the power conversion circuit 3 is output from the output node OUT2 of the second voltage change rate detection circuit 1b.

Since the voltage of the output node n1 of the power conversion circuit 3 changes periodically, it is necessary to discharge the accumulated charge of the fifth capacitor C5 before a timing at which dv/dt of the voltage of the output node n1 of the power conversion circuit 3 is desired to be detected after the charge corresponding to dv/dt is accumulated in the fifth capacitor C5. Specifically, the third switch SW3 is turned on, and thus, the accumulated charge of the fifth capacitor C5 is discharged. After the fifth capacitor C5 is discharged, the charge corresponding to the temporal change rate dv/dt of the voltage of the output node n1 of the power conversion circuit 3 is accumulated again in the fifth capacitor C5, and the DC signal having the voltage level corresponding to dv/dt is output from the second voltage change rate detection circuit 1b.

As stated above, the second voltage change rate detection circuit 1b of FIG. 12 can detect, as the DC signal, the temporal change rate dv/dt of the voltage of the output node n1 of the power conversion circuit 3 whenever the fifth capacitor C5 is discharged by the third switch SW3.

The voltage change rate detection circuit 1' of FIG. 12 outputs DC signal corresponding to the temporal change rate dv/dt from the output node OUT1 of the first voltage change rate detection circuit 1a when the voltage of the output node n1 of the power conversion circuit 3 falls, and outputs the DC signal corresponding to the temporal change rate dv/dt from the output node OUT2 of the second voltage change rate detection circuit 1b when the voltage of the output node n1 of the power conversion circuit 3 rises. Accordingly, the temporal change rate dv/dt of the voltage of the output node can be detected both when the voltage of the output node n1 of the power conversion circuit 3 falls and when the voltage thereof rises.

Third Embodiment

A third embodiment controls the power conversion circuit 3 based on the DC signal output from the voltage change rate detection circuit 1 or 1' according to the first or second embodiment.

Figure 13:
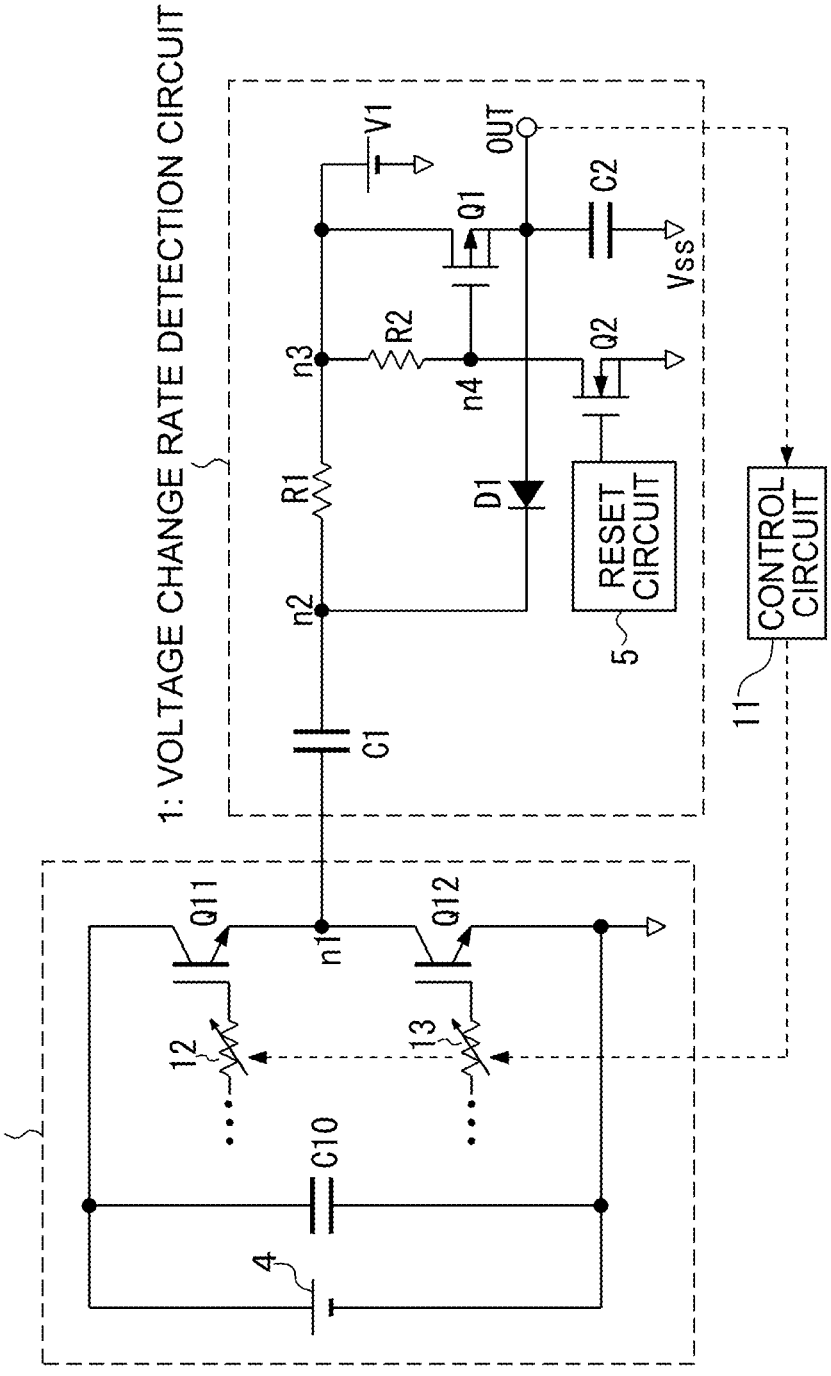
FIG. 13 is a block diagram illustrating a schematic configuration of a power converter including a voltage change rate detection circuit according to a third embodiment.

FIG. 13 is a block diagram illustrating a schematic configuration of a power converter 2b including the voltage change rate detection circuit 1 according to the third embodiment. The power converter 2b of FIG. 13 includes the voltage change rate detection circuit 1, the power conversion circuit 3, and a control circuit 11.

FIG. 13 illustrates an example in which the voltage changes rate detection circuit 1 has the circuit configuration of FIG. 1, but may have the same circuit configuration as that of FIG. 9, 10, 11, or 12 described above. The power conversion circuit 3 includes, for example, the plurality of switching elements Q11 and Q12 connected in a cascode manner, and variable resistors 12 and 13 connected to the gates of the switching elements Q11 and Q12, respectively. The power conversion circuit 3 has any internal configuration, and various circuit configurations is considered. The AC voltage converted by the power conversion circuit 3 is used to drive a load such as a motor.

The control circuit 11 controls a gate voltage of each of the switching elements Q11 and Q12 according to the voltage level of the DC signal output from the voltage change rate detection circuit 1. In a more specific example, the control circuit 11 controls the gate voltage of each of the switching elements Q11 and Q12 by controlling resistance values of the variable resistors 12 and 13 according to the voltage level of the DC signal.

It is expected that the switching elements Q11 and Q12 in the power conversion circuit 3 perform switching operations at a predetermined frequency and duty. The switching operations of the switching elements Q11 and Q12 may deviate from desired operations due to temperature and voltage fluctuations, a load fluctuation, or the like. In that case, the temporal change rate dv/dt of the voltage of the output node n1 of the power conversion circuit 3 is a value different from a desired value. Thus, in the present embodiment, the temporal change rate dv/dt of the voltage of the output node n1 of the power conversion circuit 3 is monitored by the voltage change rate detection circuit 1, and the DC signal of the voltage level corresponding to dv/dt output from the voltage change rate detection circuit 1 is supplied to the control circuit 11. The control circuit 11 controls the gate voltages of the switching elements Q11 and Q12 in the power conversion circuit 3 such that the temporal change rate dv/dt of the voltage of the output node n1 of the power conversion circuit 3 becomes a desired value based on the voltage level of this DC signal.

As stated above, the DC signal indicating the temporal change rate dv/dt of the output voltage of the power conversion circuit 3 is output from the voltage change rate detection circuit 1, and thus, a power conversion operation of the power conversion circuit 3 can be optimized by using this DC signal. More specifically, the gate voltages of the switching elements Q11 and Q12 in the power conversion circuit 3 are controlled by using the above-mentioned DC signal, and thus, an output voltage waveform of the power conversion circuit 3 can be controlled to a desired voltage waveform while having a simple circuit configuration.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An electronic circuit comprising:
an output node that outputs a DC signal indicating a temporal change rate of a voltage of a measurement target node;
a first capacitor and a first resistor that are connected in series between the measurement target node and a first reference voltage node;
a second capacitor that is connected between the output node and a second reference voltage node;
a first switch that switches whether or not to short-circuit the first reference voltage node and the output node; and
a rectifier circuit that flows a current to a connection node between the first capacitor and the first resistor from the output node, and cuts off a current to the output node from the connection node.

2. The electronic circuit according to claim 1,
wherein the second capacitor holds a charge corresponding to the temporal change rate when the voltage of the measurement target node falls.

3. The electronic circuit according to claim 2,
wherein the second capacitor holds the charge corresponding to the temporal change rate when the voltage of the measurement target node falls while the first reference voltage node and the output node are opened by the first switch.

4. The electronic circuit according to claim 1,
wherein the rectifier circuit includes a diode that includes an anode connected to the output node and a cathode connected to the connection node.

5. The electronic circuit according to claim 1,
wherein the first reference voltage node has a voltage level larger than the second reference voltage node.

6. The electronic circuit according to claim 1, further comprising:
a second resistor and a second switch that are connected in series between the first reference voltage node and the second reference voltage node,
wherein the first switch is turned on or off by a voltage of a connection node between the second resistor and the second switch, and
the second switch is turned on after the second capacitor holds a charge corresponding to the temporal change rate when the voltage of the measurement target node falls.

7. The electronic circuit according to claim 6,
wherein the first switch includes a first transistor,
the second switch includes a second transistor of a conductive type different from the first transistor, and
the first transistor decreases a voltage of the output node according to an amount of decrease of the voltage of the measurement target node.

8. The electronic circuit according to claim 7,
wherein the second transistor controls whether or not to set a control terminal of the first transistor to have a same potential as the second reference voltage node.

9. The electronic circuit according to claim 8,
wherein the second transistor sets the control terminal of the first transistor to have the same potential as the second reference voltage node after the second capacitor holds the charge corresponding to the temporal change rate of the voltage of the measurement target node.

10. The electronic circuit according to claim 9, further comprising:
a reset circuit that supplies, to a control terminal of the second transistor, a pulse signal for setting the control terminal of the first transistor to have the same potential as the second reference voltage node at a time of at least one of initial setting and for a predetermined period after the second capacitor holds the charge corresponding to the temporal change rate of the voltage of the measurement target node.

11. The electronic circuit according to claim 10,
wherein the first transistor is a P-type transistor,
the second transistor is an N-type transistor,
a source of the first transistor is connected to the first reference voltage node,
a drain of the first transistor is connected to the output node,
a gate of the first transistor is connected to a drain of the second transistor,
a source of the second transistor is connected to the second reference voltage node, and
the reset circuit is connected to a gate of the second transistor.

12. The electronic circuit according to claim 11, further comprising:
a third capacitor that is connected between the drain of the first transistor and the source of the first transistor.

13. The electronic circuit according to claim 1,
wherein the first capacitor has a capacitance value of 1/10 or less of an output capacitance of the measurement target node.

14. The electronic circuit according to claim 1,
wherein a resistance value of the first resistor, a capacitance of the first capacitor, and a capacitance of the second capacitor are set such that a time constant required from when the voltage of the measurement target node changes to when the DC signal indicating the temporal change rate of the voltage of the measurement target node is output from the output node is 100 nanoseconds or less.

15. The electronic circuit according to claim 14,
wherein the capacitance C1 of the first capacitor, the capacitance C2 of the second capacitor, and the resistance value R1 of the first resistor are set such that the time constant T satisfies Equation (1)

$$T \geq 2.2 \times R1 \times (C1+C2) \quad (1).$$

16. The electronic circuit according to claim 1,
wherein a voltage Vout of the output node is expressed by Equation (2) by using the temporal change rate dv/dt of the voltage of the measurement target node, a capacitance C1 of the first capacitor, a capacitance C2 of the second capacitor, and a resistance value R1 of the first resistor $$Vout = C1 \times R \times (dv/dt) \times [1 - \exp\{-t/R\,(C1+C2)\}] \quad (2).$$

17. An electronic apparatus comprising:
a substrate; and
an electronic circuit provided on the substrate,
wherein the electronic circuit includes:
an output node that outputs a DC signal indicating a temporal change rate of a voltage of a measurement target node,
a first capacitor and a first resistor that are connected in series between the measurement target node and a first reference voltage node,
a second capacitor that is connected between the output node and a second reference voltage node,
a first switch that switches whether or not to short-circuit the first reference voltage node and the output node, and
a rectifier circuit that flows a current to a connection node between the first capacitor and the first resistor from the output node, and cuts off a current from the connection node to the output node.

18. The electronic apparatus according to claim 17,
wherein the electronic circuit further includes a second resistor and a second switch that are connected in series between the first reference voltage node and the second reference voltage node,
the first switch is turned on or off by a voltage of a connection node between the second resistor and the second switch, and
the second switch is turned on after the second capacitor holds a charge corresponding to the temporal change rate when the voltage of the measurement target node falls.

19. An electronic apparatus comprising:
a power conversion circuit that performs power conversion;
an electronic circuit that outputs a DC signal indicating a temporal change rate of an output voltage of the power conversion circuit at a first output node; and
a control circuit that controls the power conversion circuit based on the DC signal,
wherein the electronic circuit comprises
a second output node that outputs the DC signal,
a first capacitor and a first resistor that are connected in series between the first output node and a first reference voltage node,
a second capacitor that is connected between the second output node and a second reference voltage node,
a first switch that switches whether or not to short-circuit the first reference voltage node and the second output node, and
a rectifier circuit that flows a current to a connection node between the first capacitor and the first resistor from the second output node, and cuts off a current from the connection node to the second output node.

20. The electronic apparatus according to claim 19,
wherein the power conversion circuit includes a switching element connected to the first output node, and
the control circuit controls a voltage of a control terminal of the switching element based on the DC signal such that the DC signal has a predetermined voltage level.

* * * * *